(12) United States Patent
Miyao et al.

(10) Patent No.: US 7,381,094 B2
(45) Date of Patent: Jun. 3, 2008

(54) CARD CONNECTOR

(75) Inventors: Taichiro Miyao, Kanagawa (JP); Norihiro Asaoka, Kanagawa (JP); Hideyasu Yamada, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/892,249

(22) Filed: Aug. 21, 2007

(65) Prior Publication Data

US 2008/0050937 A1   Feb. 28, 2008

(30) Foreign Application Priority Data

Aug. 25, 2006   (JP) .............................. 2006-229793

(51) Int. Cl.
    *H01R 24/00* (2006.01)
(52) U.S. Cl. ..................................... 439/630
(58) Field of Classification Search ................ 439/152, 439/159, 630, 155, 157, 160, 629, 310, 333, 439/607, 328, 631–632
    See application file for complete search history.

(56) References Cited

U.S. PATENT DOCUMENTS

| 6,089,891 A * | 7/2000 | Nishioka ..................... 439/159 |
| 7,326,070 B2 * | 2/2008 | Chen et al. .................. 439/159 |
| 2006/0089032 A1 * | 4/2006 | Chen ........................... 439/159 |

FOREIGN PATENT DOCUMENTS

| JP | 2002-319453 A | 10/2002 |
| JP | 2003-86289 A | 3/2003 |
| JP | 2003-86290 A | 3/2003 |
| JP | 2004-94713 A | 3/2004 |
| JP | 2005-71667 A | 3/2005 |
| JP | 2005-85684 A | 3/2005 |
| JP | 2005-190908 A | 7/2005 |
| JP | 2005-203231 A | 7/2005 |
| JP | 2005-228518 A | 8/2005 |
| JP | 2005-353368 A | 12/2005 |

* cited by examiner

*Primary Examiner*—Edwin A. León
(74) *Attorney, Agent, or Firm*—Rader, Fishman & Grauer, PLLC

(57) ABSTRACT

A sliding member is disposed on one wing of the concave portion to advance and retreat in directions parallel to insertion and ejection of a card, and formed a heart-shaped cam groove. The base-end side of the leaf spring is fastened to the sliding member; the other end projects toward the opening of the concave portion. A compressed-coil spring applies a biasing force on the sliding member in a direction of card ejection. One end of the guide rod is coupled to the heart-shaped cam groove; the other end is pivotably supported on the housing. The sliding member has an engaging piece that touches an oblique side formed on a side surface of the card, and the leaf spring has a semi-circular claw that moves in and out of a surface of the card at a substantially square concave portion, thereby resiliently engaging the concave portion.

4 Claims, 10 Drawing Sheets

CARD CONNECTOR

This application is based on and claims the benefit of priority from Japanese Patent Application No. 2006-229793, filed on 25 Aug. 2006, the content of which is incorporated herein by reference.

BACKGROUND OF THE INVENTION

1. Field of the Invention

The present invention relates to card connectors. Particularly, the present invention relates to manufacturing card connectors that electrically connect to a miniature memory card such as a micro SD (Secure Digital) card being inserted into the connector.

2. Related Art

A memory card, which is a card-shaped memory device, employs flash memory as a memory medium. The memory card is extremely compact and consumes very little electrical power in reading and writing data. For these reasons, memory cards have become popular as a memory medium for hand-held information devices, as represented, for example, by camera-cellphones and PDAs (Personal Digital Assistant).

In the past, memory cards had the image of having low memory capacity, yet higher costs, compared to other disk-shaped memory devices such as flexible disks (FD) and magnetic optical disks (MO). However, technical advancements made in recent years, and the effects of mass production accompanying popularization of devices that use memory cards, has pushed memory capacity to more than 128 MB, and driven down costs.

Furthermore, a benefit of memory cards is that a drive device is not required to read and write data, unlike FD and MO. For this reason, they are preferred for use in digital cameras, laptop computers and hand-held music players, in which power consumption and portability are important.

Compared to the outside dimensions of a miniSD card at 20 mm (W)×21.5 mm (L)×1.4 mm (T), the outside dimensions of a microSD is 11 mm (W)×15 mm (L)×1.0 mm (T), making it approximately half the width, and an approximately ¼ reduction in volume.

Necessary data are read and written by mounting such memory cards to a card connector. Generally, card connectors are provided with a sliding member that moves along with the memory card being inserted, and a locking mechanism that holds the memory card at the mounted position. In addition, this card connector is configured so that when the mounted memory card is pressed once again, the lock is disengaged and the sliding member ejects the memory card.

From a card connector of this kind of configuration, a card connector has been invented that prevents the memory card from suddenly being ejected when a shock, such as by being dropped, is applied. (For example, Japanese Unexamined Patent Application Publication No. 2003-86289, hereinafter referred to as Patent Document 1.)

Furthermore, from a card connector with this kind of configuration, a card connector has been invented that securely resists the memory card from being forcefully ejected. (For example, Japanese Unexamined Patent Application Publication No. 2005-353368, hereinafter referred to as Patent Document 2.)

FIG. 10 shows a plan view of the card connector of Patent Document 1. This drawing shows a guide member that separates from a heart-shaped cam groove when impacted to prevent disengaging of a locking pin. FIG. 10 of this application is equivalent to FIG. 16 of Patent-Document 1.

As shown in FIG. 10, the card connector 8 is equipped with a housing 81, a sliding member 86, a return spring 83, and a locking mechanism. A card (memory card) 8c is housed in the housing 81. The sliding member 86 is arranged to move in an insertion direction and an ejection direction of the card 8c by engaging the card 8c along with the insertion and ejection of the card 8c. The return spring 83 biases the sliding member 86 in the direction to eject the card 8c. The locking mechanism locks the sliding member 86 at card 8c housed position, resisting the biasing force of the return spring 83.

As shown in FIG. 10, one end of the locking mechanism is provided with a locking pin 84 that pivotably engages the sliding member 86, and a heart-shaped cam groove 8g formed with a cam groove 8h. The locking pin 84 locks the sliding member 86 at the card 8c housed position, and unlocks the sliding member 86 by moving from the locked position to the inside. The heart-shaped cam groove 8g has a locking portion 8i: another end of the locking pin 84 slides.

In addition, in FIG. 10, the housing 81 has a guide member 87 and a biasing spring 85. The guide member 87 moves in the insertion and ejection directions of the card 8c. This guides the movement of the locking pin 84 in cooperation with the heart-shaped cam groove 8g. The biasing spring 85 biases the guide member 87 in a direction to enable the locking pin 84 to lock.

It is disclosed that with the card connector according to Patent Document 1, when there is an impact from outside, the guiding member 87 resists the baising force of the baising spring 85 to prevent another end of the locking pin 84, which is guided by the guide member 87, from detaching from the locking portion 8i, by moving in a direction to separate from the heart-shaped cam groove 8g. More specifically, normally, one end of the locking pin 84 moves to a first oblique surface 8f side formed on one surface of a V-shaped projection that opposes the lock portion 8i to eject the card 8c. In the event that an external impact occurs, the other end of the locking pin 84 moves to a second oblique surface side 8e formed on one surface of the V-shaped projection, and the locking pin 84 is stopped by the heart-shaped cam groove 8g.

As shown in FIG. 10, the leaf spring 88 applies biasing force for the sliding member 86 to pivot to the card 8c side. A leading end of the sliding member 85 is formed to a substantially L-shape to be a card bearing portion 86b that makes contact with the leading end of the card 8c. Also, an angled convex latching portion 86c is provided between the base portion and the leading end portion of the sliding member 86. The convex latching portion 86c can engage a square latching concave portion 8a formed at a wing of the card 8c.

As shown in FIG. 10, the card 8c moves in an ejection direction pushed out by the card bearing portion 86b. When the sliding member 86 stops, the convex latching portion 86c abuts the latching concave portion 8a so the card 8c is held in the housing 81. By pulling out the card 8c with a comparatively strong force, the oblique surface of the convex latching portion 86c and the corner of the latching concave portion slide, and the sliding member 86 pivots in the releasing direction to enable the card to be withdrawn.

Here, it is conceivable that with the card connector of Patent Document 1, when the card 8c is ejected, inertial force acts on the card 8c, causing the card 8c to unexpectedly be ejected. To prevent the unexpected ejection of the card 8c, it would be difficult to pull out the card 8c if the oblique surface of the convex latching portion 86c were moderately oblique. It is also difficult to attempt to attain a balance of the oblique surface of the convex latching portion 86c and the biasing force of the leaf spring 88, and to compensate for the manufacturing error of the various elements, including the card, and the clearance. A structure of a card connector that securely prevents unexpected ejection of the card 8c is needed.

FIG. 11 shows a plan view of the card connector according to Patent Document 2, illustrating a card partway ejected from the card connector. FIG. 11 of this application is equivalent to FIG. 2 of Patent Publication 2.

With the card connector 9 shown in FIG. 11, when the card 9c is ejected from the housing 92, the sliding member 94 is released from the lock of the locking pin 96, and is slid from the inside 92a to the entrance 92b by the returning force of a coil spring 95. At that time, the card bearing portion 94b, formed to a substantially L-shape on the leading end of the sliding member 94, pushes the leading end of the card 9c so the card 9c also moves.

In the ejection process of the card 9c, one end 94c of the sliding member 94 starts to compress the rubber brake 97. A hollow portion 97b is provided in the rubber brake 97. This resiliently deforms in a right-angle direction to a compression direction so a contact portion 97a of the triangular shaped leading end compresses a side portion of the card 9c. Therefore, the card connector of Patent Document 2_inhibits the card 9c from unexpectedly being ejected from the housing 92.

Since the card 9c is biased by a rubber body in the card connector disclosed in Patent Document 2, there is a durability problem to wear caused by repeated use. Furthermore, with the card 9c mounted, because the card is held by only the pressing force of a plurality of contacts 93 (see FIG. 11), there is the danger of the card being moved by vibrations, or the like. This can also be a cause of improper contact between the card 9c and the contact 93. A card connector structure that securely maintains the card in its mounted state is needed. The aforementioned problems are issues to be solved by present invention.

SUMMARY OF THE INVENTION

In view of the aforementioned problems, an object of the present invention is to provide a card connector that securely prevents a card from unexpected ejection, and securely maintains the card in a mounted state.

The inventors focused on more securely preventing unexpected card ejection, and securely maintaining the mounted state of the card by disposing a leaf spring on the sliding member, and mating that leaf spring to a square concave portion formed in the card. Based on this, a new card connector was invented.

In a first aspect of the present invention, a card connector is provided having a plate-shaped housing that forms a concave portion where a card is inserted or ejected; and a cover that covers the housing concave portion. The card connector has a sliding member disposed on a wing of the concave portion to advance and retreat in directions parallel to the card insertion and ejection directions, respectively, formed with a heart-shaped cam groove; a leaf spring with a base-end thereof fastened to the sliding member, the leading-end thereof projecting toward an opening of the concave portion; a compressed-coil spring held at the housing, which applies a biasing force in a direction for the sliding member to eject the card; a guide rod with one end thereof coupled to the heart-shaped cam groove, the other end pivotably supported by the housing; in which the sliding member has an engaging piece projecting from the wing side of the concave portion to the concave portion, which touches an oblique side formed on a side surface of the card, and the leaf spring moves in and out from a surface at a substantially square-shaped concave portion adjacent to the card oblique side, and has a semi-circular claw that resiliently engages the substantially square-shaped concave portion of the card.

The card connector according to the first aspect of the present invention is provided with a plate-shaped housing and a cover. The housing forms a concave portion where a card is inserted and ejected. The cover covers the housing concave portion. Also, the card connector according to the first aspect of the present invention is provided with a sliding member, a leaf spring, a compressed-coil spring, and a guide rod.

The sliding member is disposed on a wing of the concave portion to advance and retreat in directions parallel to card insertion and ejection, respectively. The sliding member is formed with a heart-shape cam groove. The base-end side of the leaf spring is fastened to the sliding member, the other end projecting towards the opening of the concave portion. The compressed-coil spring is supported by the housing and applies a biasing force on the sliding member in a direction to eject the card. One end of the guide rod is coupled to the heart-shaped cam groove, and the other end is pivotably supported on the housing.

The sliding member has an engaging piece that projects from the wing side of the concave portion and touches an oblique side formed on a side surface of the card. The leaf spring has on a leading end a semi-circular claw that moves in and out of the surface side at the substantially square concave portion adjacent to the oblique side of the card, thereby resiliently engaging the substantially square concave portion.

The housing has insulating properties. The housing with insulating properties may be a housing composed of non-electrically conductive material, or an insulated housing of a predetermined shape formed of a synthetic resin. Also, a plurality of contacts is disposed in parallel in the concave portion of the housing. Here, to be parallel indicates that the contacts are aligned adjacently in a row, disposed side-by-side. The contacts have conductive properties. It is possible to attain conductive contacts with predetermined shapes by processing of punching or bending a conductive metal plate. Considering the ease of forming contacts, their springing characteristic and conductivity, a copper alloy is preferred, for example. However, this is not to be construed as to be a limitation to copper alloy.

Generally, cards are embedded with an IC chip inside an insulated plastic frame. This IC chip is connected to a plurality of metallic foil pieces affixed to a surface of the frame. In addition, a plurality of metallic foil pieces disposed in parallel are the connecting terminals for the card. Individual contacts can be connected one-to-one with individual metallic foil terminals, for mechanical and electrical connection.

The contacts may employ a cantilever contact having a cantilevered spring action. Each contact can be composed of a resilient arm and a fixed arm. The resilient arm projects from a bottom surface of the concave portion and is equipped with a contact point that touches a connecting terminal formed on the card. The fixed arm can be fixed by being pressed into the concave portion. A lead section can be formed at an end of the fixed arm. The lead section is soldered to a printed circuit board to enable the card connector to be a surface mount connector.

The housing has a pair of opposing side walls and a stopper wall that touches a leading end of the card, intersecting the pair of side walls. The thin, rectangular-shaped space enveloped by the pair of side walls and the stopper wall can be defined as the card concave portion for card insertion. Also, it can be a card holding section. Moreover, by covering the concave portion with the cover, a rectangular-shaped opening is formed opposite the stopper wall for the insertion of the card. The distance of the opposing pair of side walls can be slightly wider than the card width; the opposing pair of side walls controlling the attitude (inclination) of the card so that the contact with the connecting terminals of the card is correctly positioned.

The cover is composed of a sheet metal, and made by fabricating sheet metal that is developed to attain the desired shape of the cover. The cover can be composed of a conductive sheet metal. Covering the housing provides a shielding effect.

Both wings of the cover can be bent to right angles. Rectangular holes are formed in these folded pieces so that detents projecting at both side surfaces of the housing engage the holes. Also, a cover is provided over the leads soldered to the printed circuit board to reinforce the strength of the joint with the printed circuit board, and to connect the cover to a ground of the printed circuit board. Furthermore, a plurality of first springs, which bias the inserted card to the bottom surface of the concave portion, and a second spring that biases the guide rod to the bottom surface of the heart-shape cam groove, are provided on the surface of the cover that opposes the concave portion.

A sliding member is disposed on one wing of the concave portion. A card detection switch, which electrically detects that the card is at the mounted position, is provided on the other wing of the concave portion. For example, the card detection switch can be composed of a movable plate and a fixed plate. When the card is at the mounted position, the card displaces the movable plate so the movable plate and fixed plate are electrically connected. When the card is withdrawn, the movable plate returns to its original position, thereby electrically disconnecting the movable plate and the fixed plate. In this way, the presence of the card is detected.

A groove is provided in the wing of the housing to movably guide the sliding member. The sliding member can advance and retreat while being controlled by the groove, in a direction parallel with the insertion and ejection of the card. The sliding member is allowed to advance and retreat only in a linear movement.

For example, a first cylindrical projection that projects into the groove is formed on the sliding member. On the other hand, the housing is formed with a second cylindrical projection that projects into the groove, opposing the first cylindrical projection. In addition, by mounting both coil ends of a compressed-coil spring between the first and the second cylindrical projections, it is possible to apply a biasing force to the sliding member in a direction to eject the card. When the card is not inserted, the sliding member is biased by the compressed-coil spring and stopped at the opening side of the concave portion.

Both ends of the guide rod can be deflected to substantially right angles, with one end of the guide rod being connected to the heart-shaped cam groove that pierces a surface of the sliding member. On the other hand, the other end of the guide rod is inserted into a hole formed near the groove. It is pivotably supported. One end of the guide rod follows the heart-shape cam groove.

The cam moves the sliding member having the heart-shaped cam groove, and the guide rod follows. The sliding member and guide rod compose a cam device with relative displacement of the cam and follower. In addition, the cam groove not only has a plane curve that follows a heart-shaped locus, but also has a space curve that includes a continuous locus where the bottom surface of the cam groove has a difference in level or an oblique surface. The sliding member and guide rod can configure a so-called solid cam device.

Still further, the heart-shape cam groove follows a locus of a forward stroke from a starting point, and a locus of a return stroke to return to the starting point. The locus of the heart-shape cam groove follows a directional continuous locus where one end of the guide rod will not go back during that stroke, even if one end of the guide rod partially reverses. In reality, a V-shaped groove that is depressed into a V-shape is formed at the branching point of the locus for the forward stroke and the locus of the return stroke. One end of the guide rod is stopped at the V-shaped groove so it is biased by the compressed-coil spring to lock the sliding member at the card mounted position. The cam device configured by the heart-shaped cam groove and the guide rod can be said to define the sliding member stopping position.

The base end side of the leaf spring can be fastened by being pressed into the sliding member. The leading end of the leaf spring is disposed to project toward the opening of the concave portion. The leaf spring and sliding member integrally advance and retreat. The leaf spring may have a cantilevered spring action. A load acting on the semi-circular claw formed at the leading end of the leaf spring 5 causes it to elastically deform.

The card is formed to be substantially rectangular, the width at the leading end where connecting terminals are disposed being narrower than the base end. Of both parallel side surfaces, an oblique side is formed on one side surface, the oblique side forming a blunt angle at the leading end of the card. This continues on one side to the base end side, both sides of which are parallel. In other words, one corner side of the leading end of the card 1 is formed to a blunt angle notch. Also, a substantially square concave portion is formed adjacent to the oblique side of the card.

When the card is inserted into the housing concave portion, the oblique side touches a semi-circular claw. Then, when the card is inserted, the semi-circular claw slides along the oblique side and is pushed downward. When the oblique side touches the leading end of the engaging piece, the semi-circular claw slides along the surface of the card to protrude into the concave portion of the card. It should be noted that an oblique surface having the same gradient as the oblique side of the card can be formed at the leading end of the engaging piece. Next, when the card is pushed, the sliding member moves to the inside direction of the concave portion.

When the card is pushed all the way in, and has returned slightly, an end of the guide rod stops at the V-shaped groove. At the card mounted position, the sliding member is locked in the housing. At the card mounted position, the semi-circular claw at the leading end of the leaf spring resiliently stops in the card concave portion, so the card mounting state is securely maintained.

When the card is pushed again from the card mounted state, one end of the guide rod is released from the V-shaped groove to move in the return stroke. Biased by the compressed-coil spring, the sliding member moves the card to the opening of the concave portion. At the point where the one end of the guide rod returns relative to the starting point of the heart-shape cam groove, the sliding member stops. Here, inertial force acts on the card; however, since the semi-circular claw is resiliently engaging the concave portion of the card, it is possible to securely prevent the card form being unexpectedly ejected. In addition, the card is pulled out by a comparatively strong force, so the card will not detach from the connector.

Thus, the card connector of the first aspect of the present invention securely prevents a card from unexpectedly being ejected, and securely maintains the card mounting state by a leaf spring having a semi-circular claw being equipped at a sliding member and the semi-circular claw mating with a square concave portion formed in a card.

In a second aspect of the card connector according to the first aspect of the present invention, the housing has a groove that guides the movement of the sliding member, a path that communicates with the groove, and the leading end of the leaf spring moves adjacent to the path. The bottom surface of the path is open from the open side of the concave portion to partially toward the inside, and the bottom surface is closed from partially to the end edge.

The housing of the card connector according to the second aspect of the present invention has a groove and a path communicating to the groove. The groove guides the movement of the sliding member. The leading end of the leaf spring moves adjacent to path. In addition, the bottom surface of the path is open from the open side of the concave portion to partially toward the inside, and is closed from partially to the end edge the bottom surface.

The groove can be formed to a concave wing, or a substantially rectangular-shaped opening, and a portion of the flat surface of the housing formed to be depressed. The sliding member is housed to be able to advance in this groove. A part of the groove projects to the bottom surface of the concave portion, with an engaging piece moving in this projected portion. The groove can include part of the concave portion.

The square path is formed depressed from the bottom surface of the concave portion, including part of the concave portion. The path is formed in parallel to the groove, and one end communicates to the opening of the concave portion, the other end communicating to the groove. Here, the reason for the bottom surface of the path being open is to allow the leading end of the semi-circular claw to deform toward the opening. On the other hand, closing the bottom surface of the path indicates that the leading end of the semi-circular claw cannot easily deform because it touches the bottom surface of the opening.

Thus, the connector is equipped with a path for movement near the leading end of the leaf spring. Therefore, when the card is mounted, the semi-circular claws easily deform, securely holding the card. On the other hand, when ejecting the card, as described above, forceful ejection of the card is securely prevented; however, the card can be pulled out with a weak force compared to the card mounted state.

In a third aspect of the card connector according to either the first or the second aspect of the present invention, the card is a microSD card.

The card connector of the present invention securely prevents a card from unexpectedly being ejected and securely maintains the card mounting state by way of a leaf spring having a semi-circular claw being equipped at a sliding member, and the semi-circular claw mating with a square concave portion formed in the card.

DETAILED DESCRIPTION OF THE INVENTION

Figure 1:
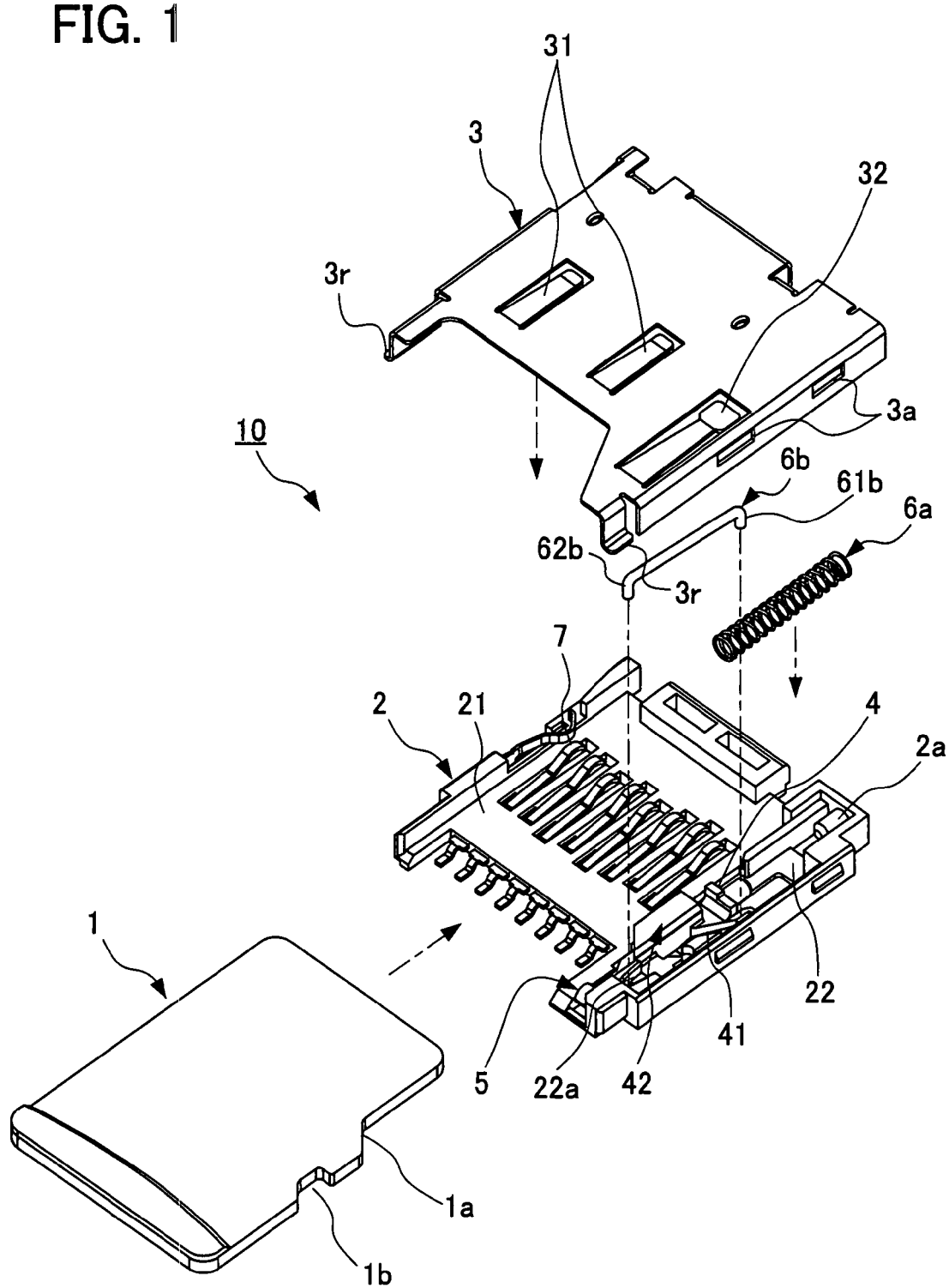
FIG. 1 is an exploded perspective view of one embodiment of the card connector according to the present invention.
Figure 2:
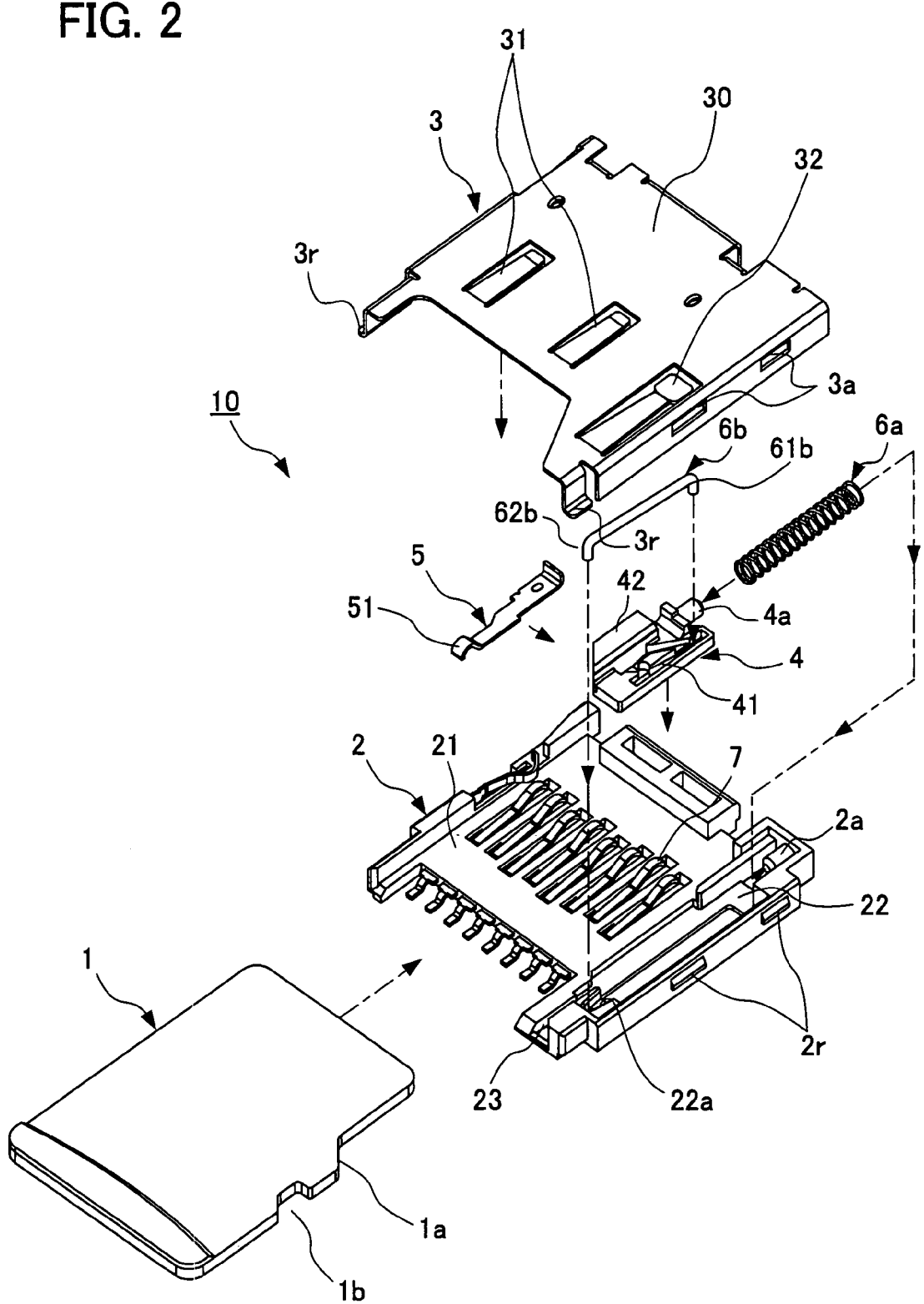
FIG. 2 is an exploded perspective view of the card connector according to the embodiment.
Figure 3:
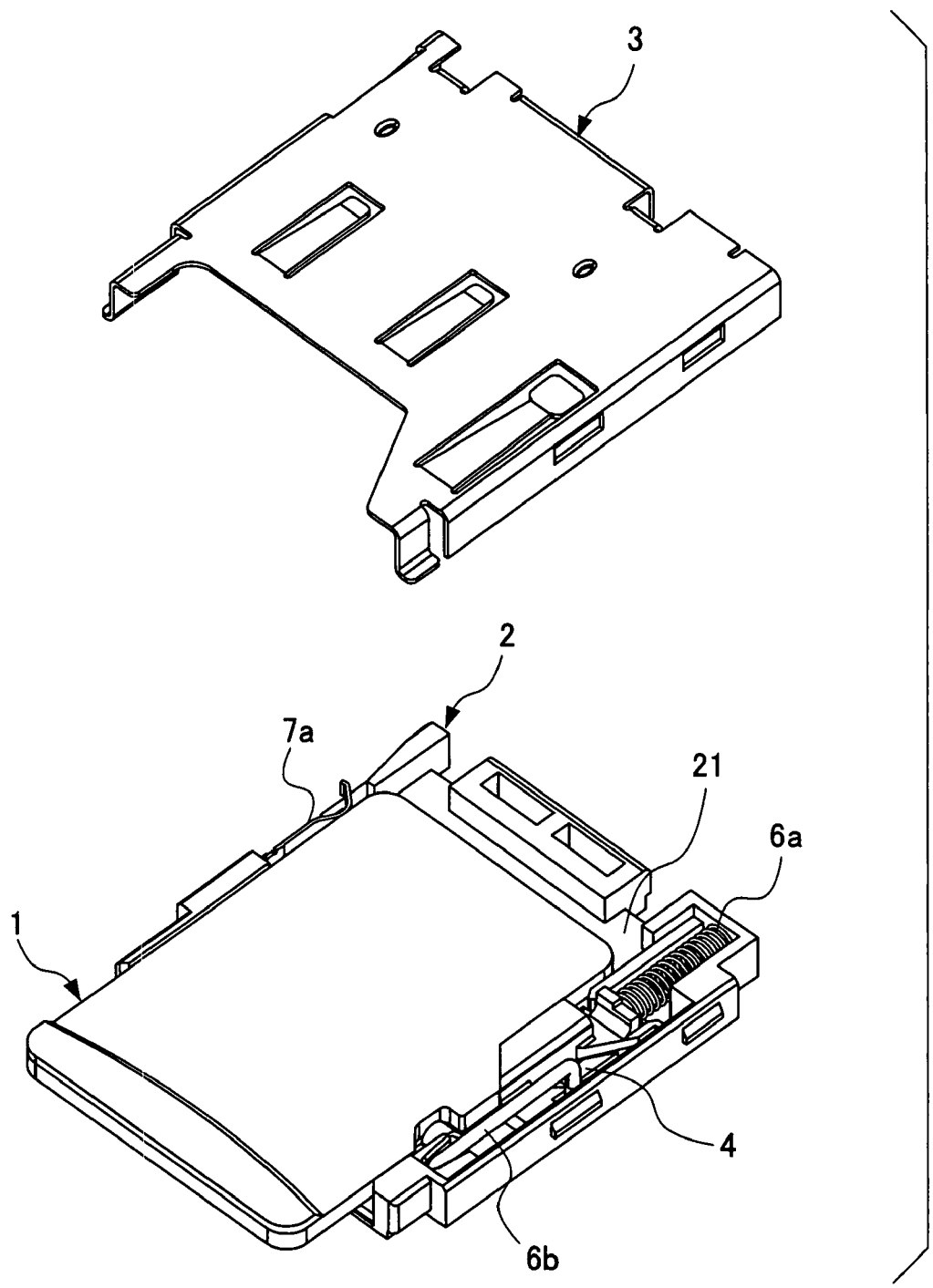
FIG. 3 is a perspective outline view of the card connector according to the embodiment, showing the cover removed.
Figure 4:
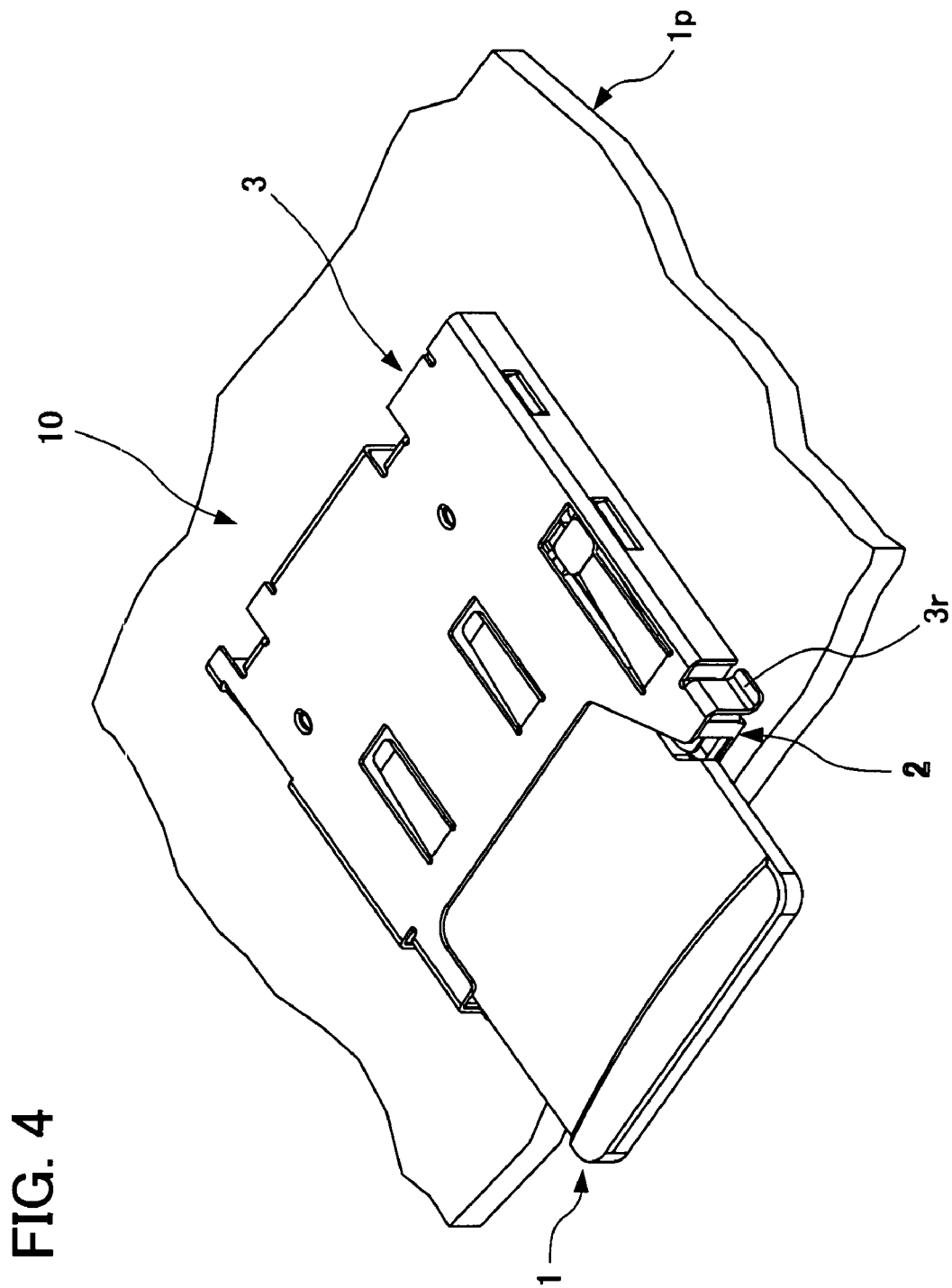
FIG. 4 is a perspective outline view of the card connector according to the embodiment, showing the cover mounted.

FIG. 1 is an exploded perspective view of one embodiment of the card connector (hereinafter referred to simply as a connector) according to the present invention. FIG. 2 is an exploded perspective view of the connector according to the embodiment. FIG. 3 is a perspective outline view of the connector according to the embodiment, and shows the cover removed. FIG. 4 is a perspective outline view of the connector according to the embodiment, and shows the cover mounted.

Figure 5:
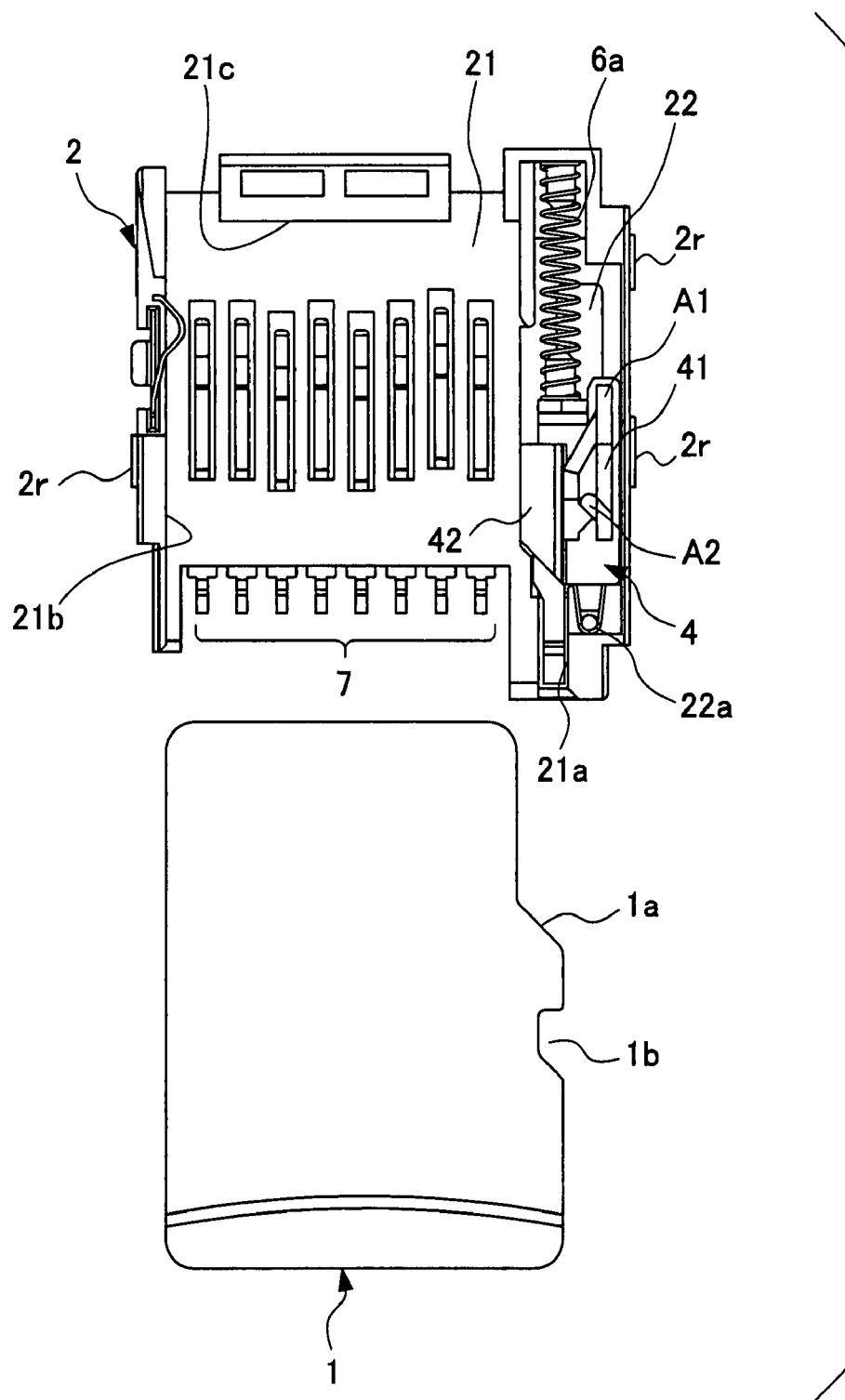
FIG. 5 is a plan view of the card connector according to the embodiment.
Figure 6:
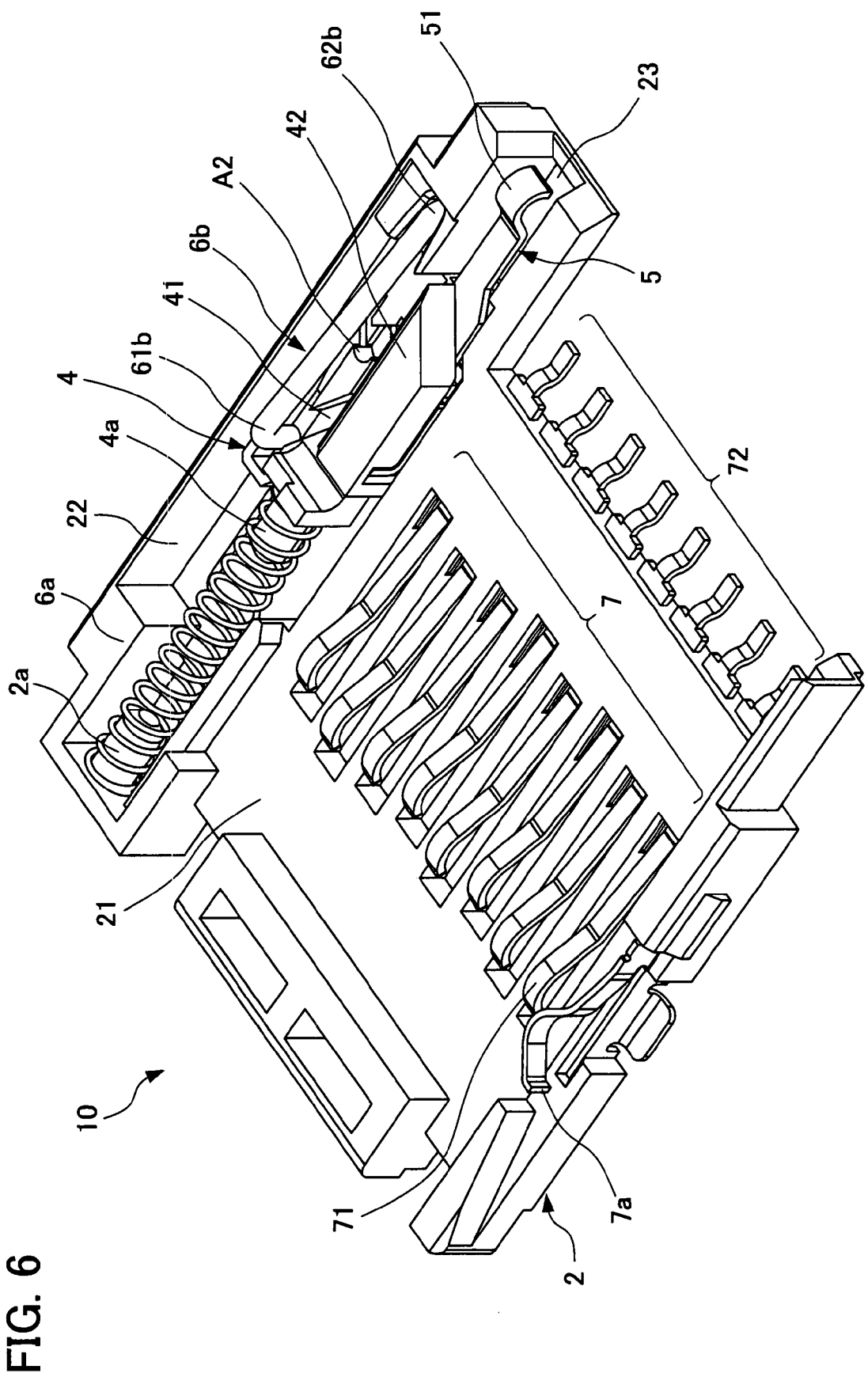
FIG. 6 is a perspective outline view of the card connector according to the embodiment, showing the card connector from a direction different from FIG. 3.
Figure 7:
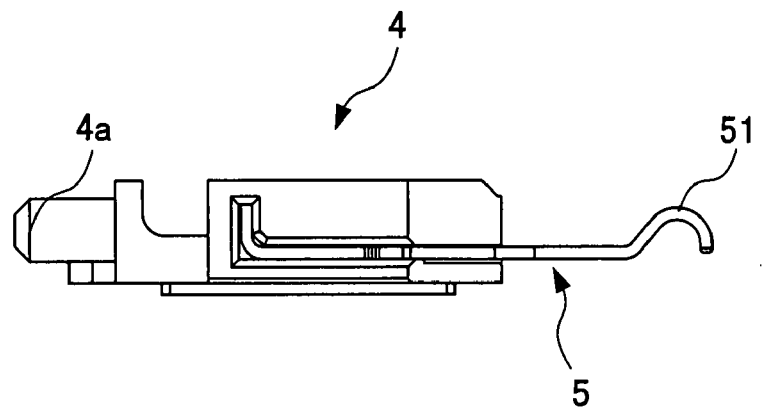
FIG. 7 is a side view of the sliding member of the card connector according to the embodiment.
Figure 8:
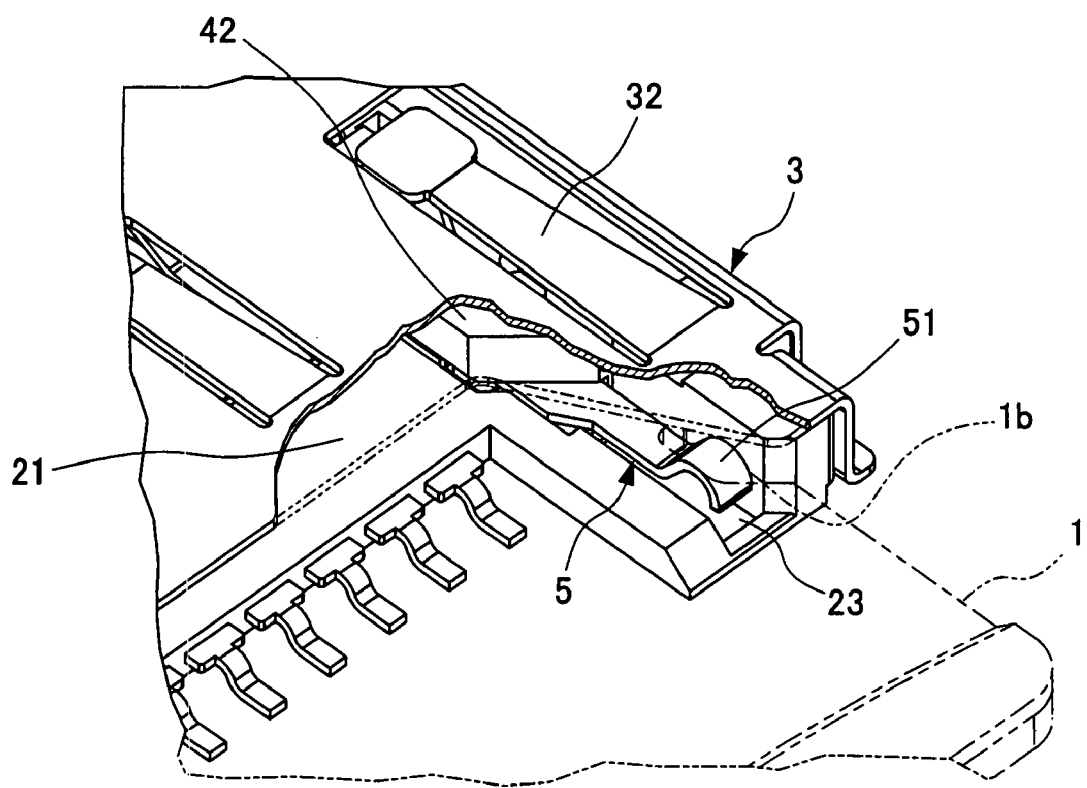
FIG. 8 is an expanded perspective outline view of an essential portion of the card connector according to the embodiment.
Figure 9:
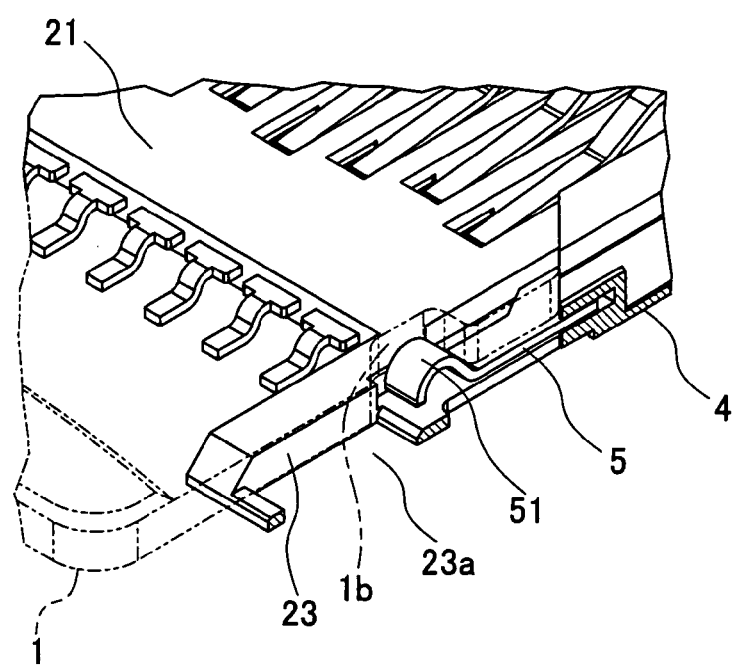
FIG. 9 is an expanded perspective outline view of the essential portion of the card connector according to the embodiment, showing a cross-section of a portion.
Figure 10:
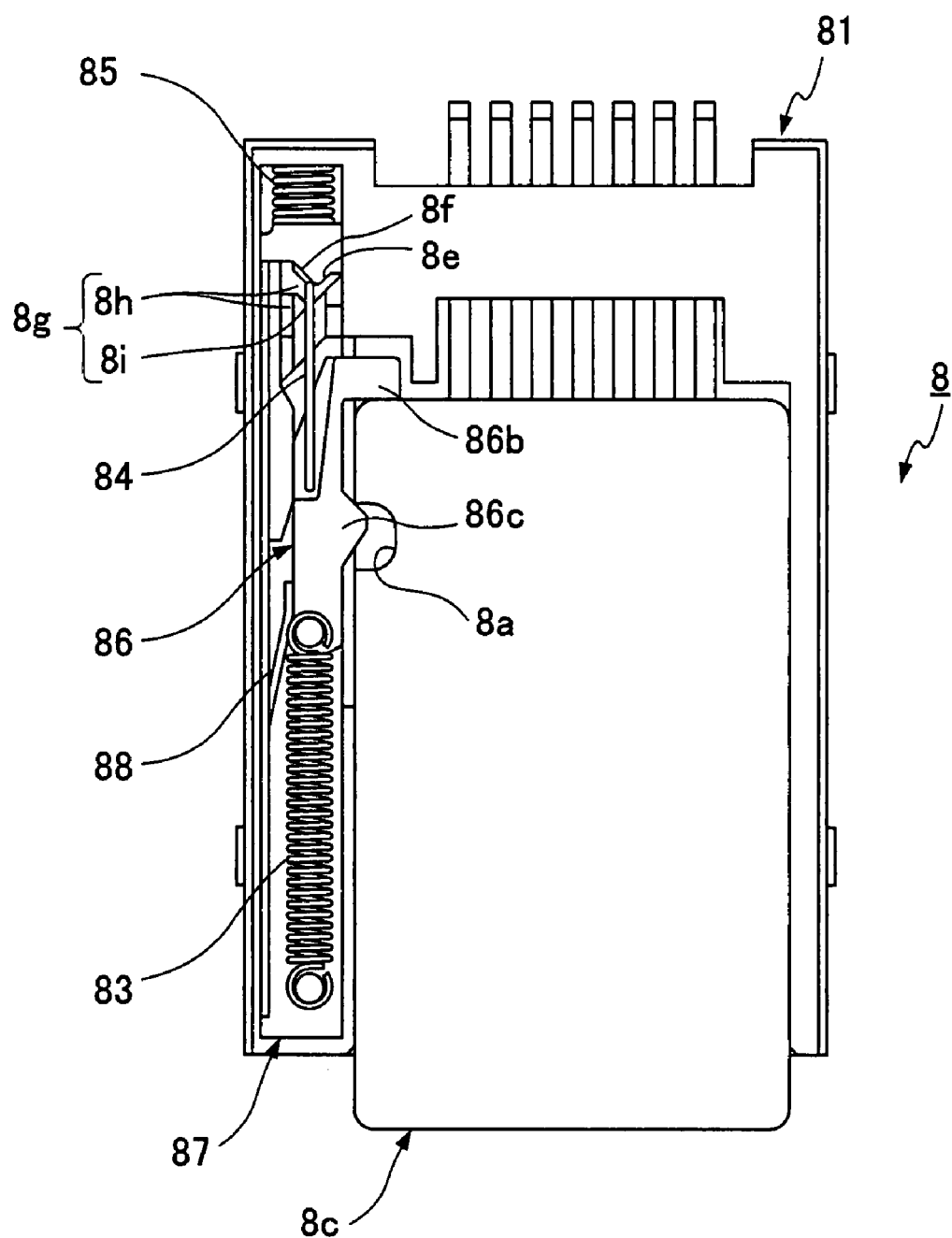
FIG. 10 is a plan view of the card connector of the related art, showing a state preventing unlocking of a locking pin at an impact when a guide member separates from a heart-shaped cam groove.
Figure 11:
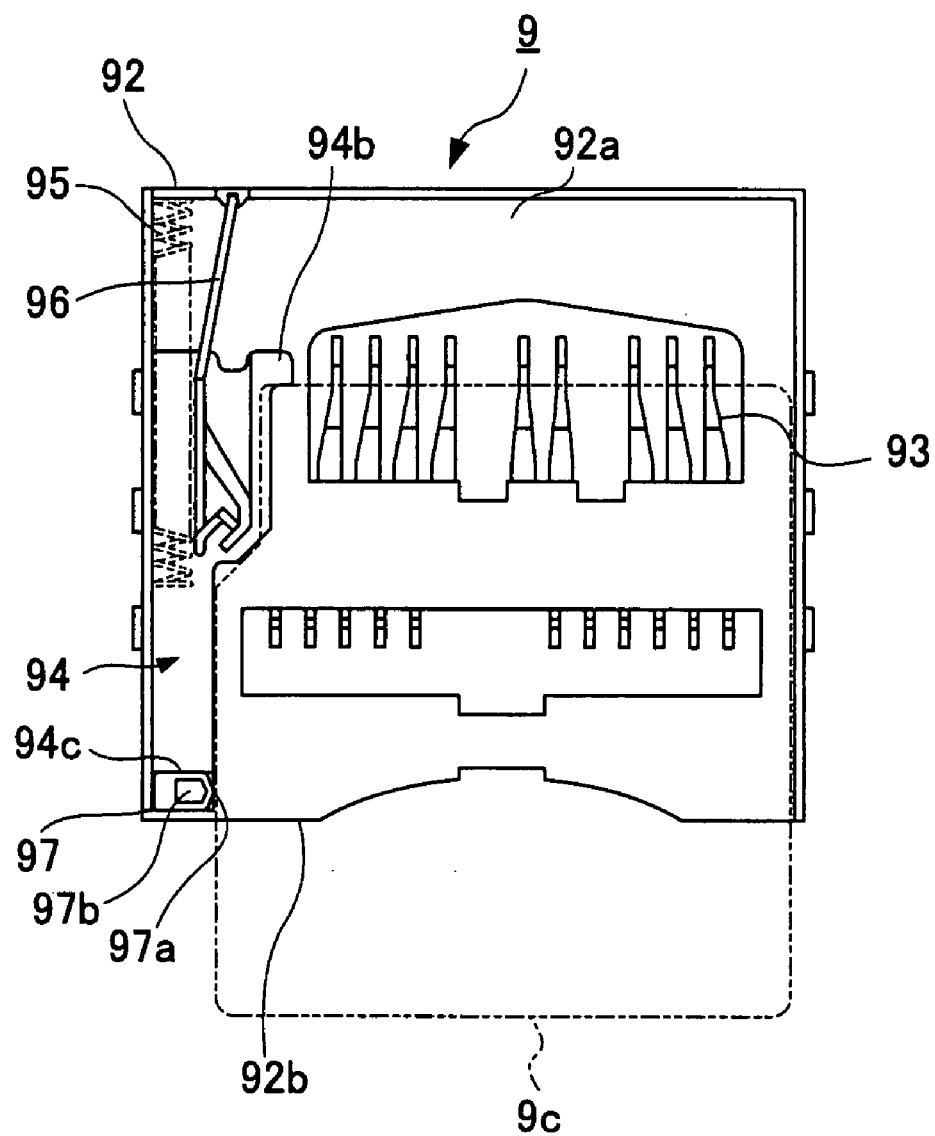
FIG. 11 is a plan view of the card connector of the related art, showing a card partially ejected from the card connector.

FIG. 5 is a plan view of the connector according to the embodiment. FIG. 6 is a perspective outline view of the connector according to the embodiment, showing the connector from a direction different from FIG. 3. FIG. 7 is a side view of the sliding member of the connector according to the embodiment. FIG. 8 is an expanded perspective outline view of an essential portion of the connector according to the embodiment. FIG. 9 is an expanded perspective outline view of the essential portion of the connector according to the embodiment, showing a cross-section of a portion.

FIG. 1 is an exploded perspective view of one embodiment of the card connector (hereinafter referred to simply as a connector) according to the present invention, and FIG. 2 is an exploded perspective view of the connector according to the embodiment. The configuration of the connector according to the present invention is explained below with reference to these drawings. The connector 10 is equipped with a plate-shaped housing 2 and a cover 3. The housing 2 forms a concave portion 21 where a card 1 is inserted and ejected. The cover 3 covers the concave portion 21 of housing 2. The housing 2 is formed in a rectangular shape by a synthetic resin having insulating properties. The cover 3 is formed by a metal plate, both wings bent in a substantially L-shape.

In addition, as shown in FIGS. 1 and 2, the connector 10 is equipped with a sliding member 4, a leaf spring 5, a compressed-coil spring 6a, and a guide rod 6b. The sliding member 4 is disposed on one wing of the concave portion 21 to advance and retreat in directions parallel to insertion and ejection, respectively, of a card 1. The sliding member 4 is formed with a heart-shape cam groove 41. The base-end side of the leaf spring is fastened to the sliding member 4, and the other end projecting towards the opening of the concave portion 21. The compressed-coil spring 6a is supported by the housing 2 and applies a biasing force on the sliding member in a direction of card 1 ejection. One end 61b of the guide rod 6b is coupled to the heart-shaped cam groove 41, and the other end 62b is pivotably supported on the housing 2.

Furthermore, as shown in FIGS. 1 and 2, the sliding member 4 has an engaging piece 42 that projects from the wing side of the concave portion 21 and touches an oblique side 1a formed on a side surface of the card 1. The leaf spring 5 has on a leading end a semi-circular claw 51 that moves in and out of a surface at the substantially square concave portion 1b adjacent to the oblique side 1a of the card 1, thereby resiliently engaging the concave portion 1b.

FIG. 3 is a perspective outline view of the connector according to the embodiment, and shows the cover removed. FIG. 4 is a perspective outline view of the connector according to the embodiment, and shows the cover mounted. FIG. 5 is a plan view of the connector according to the embodiment. FIG. 6 is a perspective outline view of the connector according to the embodiment, showing the connector from a direction different from FIG. 3.

As shown in FIGS. 1 and 2, the connector 8 forms an opening where the card 1 is inserted, by a cover 3 being installed to the housing 2, thereby forming a thin, rectangular-shaped card holding portion. Furthermore, eight of contacts 7 are disposed in parallel in the concave portion 21 of the housing 2. A plurality of contacts 7 electrically and mechanically contact one-to-one with a plurality of connecting terminals (not shown) formed on a surface of the card 1.

As shown in FIG. 6, it is acceptable for the contacts 7 to be cantilever connectors with the springing action of a cantilever beam. The contacts are composed of a resilient arm and a fixed arm. The resilient arm projects from a bottom surface of the concave portion 21, and contact points 71 are provided that contact the connecting terminals (not shown) formed on the card 1 (See FIG. 1.). The fixed arm is fastened by being pushed into the concave portion 21. Moreover, a lead section 72 is formed at an end of the fixed arm. The lead section 72 is soldered to a printed circuit board 1p to enable the connector 10 to be a surface mount connector.

As shown in FIG. 5, the housing 2 has a pair of opposing side walls 21a and 21b and a stopper wall 21c that touches the leading end of the card 1, disposed to intersect the pair of side walls 21a and 21b. The thin, rectangular-shaped space enveloped by the pair of side walls 21a and 21b, and the stopper wall 21c can be the concave portion 21. In addition, by covering the concave portion 21 with the cover 3, a rectangular-shaped opening is formed opposite the stopper wall 21c for insertion of the card 1. The distance of the opposing pair of side walls 21a and 21b can be slightly wider than the card 1 width; the opposing pair of side walls 21a and 21b control the attitude of the card 1 so that the connecting terminals of the card 1 and the connectors 7 are correctly positioned.

As shown in FIGS. 1 and 2, both wings of the cover 3 are folded to right angles. A plurality of rectangular holes 3a is formed in these folded pieces. Since the plurality of rectangular holes 3a detents 2r, which project to both sides of the housing 2, the cover 3 can be assembled (See FIG. 5). Furthermore, leads 3r, which are soldered to the printed circuit board 1p, are provided on cover 3 (See FIG. 4). A plurality of first spring pieces 31, which biases the inserted card 1 to the bottom surface of the concave portion 21, and a second spring piece 32, which biases the guide rod 6b to the bottom surface of the heart-shape cam groove 41, are provided on a surface 30 of the cover 3 opposing the concave portion 21.

As shown in FIGS. 3 and 6, the sliding member 4 is disposed on one wing of the concave portion 21. A card detection switch, which electrically detects that the card 1 is at the mounted position, is provided on the other wing of the concave portion 21. The card detection switch is composed of a movable plate 7a and the cover 3. When the card 1 is at the mounted position (see FIG. 3), the movable plate 7a is displaced by being pushed by the card 1. Therefore, the movable plate 7a and the bent portions of the cover 3 become electrically connected. When the card 1 is ejected, the movable plate 7a returns to its original position, thereby becoming electrically disconnected from the cover 3. In this way, the presence of the card 1 is detected.

As shown in FIGS. 2 and 6, a groove 22, which guides the movement of the sliding member 4, is provided in the wing of the housing 2. The sliding member 4 advances and retreats in directions parallel to the insertion and ejection of the card 1 while being controlled by the groove 22. The sliding member 4 is allowed to advance and retreat only in a linear motion.

As shown in FIGS. 2 and 6, a first cylindrical projection 4a, which projects into the groove 22, is formed on the sliding member 4. On the other hand, the housing 2 is formed with a second cylindrical projection 2a that projects into the groove 22, opposing the first cylindrical projection 4a. In addition, by mounting both coil ends of the compressed-coil spring 6a between the first and the second first cylindrical projections 4a and 2a, it is possible to apply a biasing force to the sliding member 4 in a direction to eject the card 1. When the card 1 is not inserted, the sliding member 4 is biased by the compressed-coil spring 6a, and is stopped at the opening side of the concave portion 21.

FIG. 7 is a side view of the sliding member of the connector according to the embodiment. FIG. 8 is an expanded perspective outline view of an essential portion of the connector according to the embodiment. FIG. 9 is an expanded perspective outline view of the essential portion of the connector according to the embodiment, showing a cross-section of a portion.

As shown in FIGS. 2 and 5, the housing 2 has the groove 22 and a path 23, which communicates to the groove 22. The groove 22 guides the movement of the sliding member 4. The leading end of the leaf spring moves adjacent to the path 23 (see FIGS. 8 and 9). Moreover, the bottom surface of the path 23 is open from the opening side of the concave portion 21 to partially toward the inside, and is closed from partially to the end edge the bottom surface.

As shown in FIGS. 2 and 5, the groove 22 is a substantially rectangular-shaped opening, and a portion of the flat surface of the housing 2 is formed to be depressed. The sliding member 4 is advancably housed in the groove 22 (see FIG. 6). As shown in FIG. 6, a portion of the groove 22 projects to the bottom surface of the concave portion 21. An engaging piece 42 moves in this projected portion. The square path 23 is formed depressed from the bottom surface of the concave portion 21, including part of the concave portion 21. The path 23 is formed in parallel to the groove 22, and one end communicates to the opening of the concave portion 21, the other end communicating to the groove 22.

As shown in FIGS. 1 and 2, both ends of the guide rod 6b are bent at substantially right angles. One end 61b of the guide rod 6b is linked to the heart-shape cam groove 41 that pierces the surface of the sliding member 4. On the other hand, the other end 62b of the guide rod 6b is inserted into a hole 22a formed near to the groove 22, and is pivotably supported. One end 61b of the guide rod 6b follows the heart-shape cam groove 41.

As shown in FIGS. 1 and 2, the sliding member 4 and the guide rod 6b constitute a cam device that relatively displaces the cam and follower. In addition, the cam groove 41 not only has a plane curve that follows a heart-shaped locus (see FIG. 5), but also has a space curve that includes a continuous locus where the bottom surface of the cam groove has a level difference or an oblique surface (see FIG. 6). The sliding member 4 and guide rod 6b constitute a solid cam device.

In FIG. 5, the heart-shape cam groove 41 follows a locus in a stroke to going from a starting point A1, and a locus in a stroke to return to the starting point A1. The locus of the heart-shape cam groove 41 follows a directional continuous locus where one end 61b of the guide rod 6b cannot go back, in the entire stroke, even if one end 61b of the guide rod 6b partially backs up. Also, a V-shaped groove A2, which is depressed into a V-shape, is formed at the branching point of the locus for the forward stroke and the locus of the return stroke.

As shown in FIGS. 2 and 7, the base end of the leaf spring 5 is fastened by being pressed into the sliding member 4. In addition, the leading end of the leaf spring 5 is disposed to project toward the opening of the concave portion 21. (See FIG. 6.) The leaf spring 5 and sliding member 4 integrally advance and retreat. It is allowable for the leaf spring 5 to have a cantilevered springing action. A load acting on the semi-circular claw 51 formed at the leading end of the leaf spring 5 causes it to elastically deform.

As shown in FIGS. 1 and 5, the card 1 is formed to be substantially rectangular, with a width at the leading end where connecting terminals (not shown) are disposed being narrower than the base end. Of both parallel side surfaces, an oblique side 1a is formed on one side surface, the oblique side forming a blunt angle at the leading end of the card 1. This continues on one side to the base end side both sides of which are parallel. One corner side of the leading end of the card 1 is formed to a blunt angle notch. Furthermore, the substantially square concave portion 1b is adjacent to the oblique side 1a of the card 1.

The following explains the operations and actions of the connector according to the present invention. From the states shown in FIGS. 1 and 5, when the card 1 is inserted into the concave portion 21, the oblique side 1a of the card 1 touches the semi-circular claw 51 (see FIG. 8). Then, when the card 1 is inserted, the semi-circular claw 51 slides along the oblique side 1a and is pushed downward. When the oblique side 1a touches the leading end of the engaging piece 42, the semi-circular claw 51 slides on the surface of the card 1 to finally protrude into the concave portion 1b of the card 1 (see FIG. 8). It should be noted that an oblique surface having the same gradient as the oblique side 1a of the card 1 is formed at the leading end of the engaging piece 42. Next, when the card 1 is pushed, the sliding member 4 moves to the inside direction of the concave portion 21 (see FIG. 3).

As shown in FIG. 5, when the card 1 is pushed in all the way and then returns slightly, the one end 61b of the guide rod 6b engages the V-shaped groove A2, and at the mounted position of the card 1, the sliding member 4 is locked at the housing 2 (see FIG. 3). At the card 1 mounted position shown in FIG. 3, the semi-circular claw 51 at the leading end of the leaf spring 5 resiliently engages the concave portion 1b of the card 1, so the card 1 is securely maintained in the mounted state (See FIG. 9).

From the mounted state of the card 1 shown in FIG. 3, when the card 1 is pressed again, the one end 61b of the guide rod 6b is freed from the V-shaped groove A2, and the card 1 moves in the return stroke (see FIG. 5). Biased by the compressed-coil spring 6a, the sliding member 4 moves the card 1 to the opening of the concave portion 21. At the point where the one end 61b of the guide rod 6b returns relative to the starting point A1 of the heart-shape cam groove 41, the sliding member 4 stops (See FIG. 5). Here, an inertial force acts on the card 1, but because the semi-circular claw 51 resiliently engages the concave portion 1b of the card 1, it is possible to securely prevent the card 1 from being unexpectedly ejected. Also, the card must be pulled out using a relatively strong force, so the card 1 will not be completely ejected from the connector 10.

The card connector of the present invention securely prevents a card from unexpectedly being ejected and securely maintains the card mounting state by a leaf spring having a semi-circular claw provided at a sliding member, and the semi-circular claw mating with a square concave portion formed in a card. As a card braking means, a metal leaf spring is adopted, imparting superior durability to wear compared to a conventional rubber body.

In addition, as shown in FIG. 9, the bottom surface of the path 23 is open from the opening side of the concave portion 21 to partially toward the backside, and is closed from partially to the end edge the bottom surface. As shown in FIG. 9, by opening the bottom surface of the path 23, the leading end of the semi-circular claw 51 is able to be deformed toward the opening 23a. On the other hand, by closing the bottom surface of the path 23, the leading end of the semi-circular claw 51 is not easily deformed because it touches the bottom surface of the opening 23a.

The connector of the present invention is provided with a path for movement near the leading end of the leaf spring, so when the card is mounted, the semi-circular claw easily deforms, securely holding the card. On the other hand, when ejecting the card, as described above, the sudden ejection of the card is securely prevented, but the card can be pulled out with little force compared to the card mounted state.

In this embodiment, the connector according to the present invention is a card connector in which a microSD card is inserted and ejected, but this is not limited to a microSD card, and can be applied to a card object having an oblique side and concave portion. In addition, the connector of the present invention can be a surface mounted connector soldered to a surface of a printed circuit board, with a heart-shaped cam groove formed in the surface of the sliding member so it is possible for a low mounting height (for a narrow profile). Furthermore, the connector of the present invention has few constituting parts, contributing to a reduction in manufacturing costs.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A card connector having a plate-shaped housing that forms a concave portion into which a card is inserted or ejected, and a cover that covers the housing concave portion, comprising:

a sliding member disposed on a concave wing to advance and retreat in directions parallel to the insertion and ejection of the card, formed with a heart-shaped cam groove;

a leaf spring having a base-end side thereof fastened to the sliding member, and another end projected toward an opening of the concave portion;

a compressed-coil spring supported by the housing, and applying a biasing force on the sliding member in a direction to eject the card; and a guide rod having one end thereof coupled to the heart-shaped cam groove, and another end pivotably supported on the housing, wherein the sliding member has an engaging piece that projects from the wing side of the concave portion to touch an oblique side formed on a side surface of the card; and the leaf spring has on a leading end a semi-circular claw that moves in and out of a surface side at a substantially square concave portion adjacent to the oblique side of the card, thereby resiliently engaging the substantially square concave portion.

2. The card connector according to claim 1, wherein the housing has a groove that guides the movement of the sliding member, and a path communicating to the groove wherein a leading end of the leaf spring adjacently moves; and the bottom surface of the path is open from the open side of the concave portion to partway toward the inside, and is closed from partway to the end edge.

3. The card connector according to claim 1, wherein the card is a microSD card.

4. The card connector according to claim 2, wherein the card is a microSD card.

* * * * *